C. H. GOSCHKE.
VEHICLE SPRING.
APPLICATION FILED AUG. 20, 1913.

1,083,737.

Patented Jan. 6, 1914.

WITNESSES
Samuel Payne
Max H. Sralonitz

INVENTOR
C. H. Goschke.
Henry C. Evert
ATTORNEYS

UNITED STATES PATENT OFFICE.

CHARLES HERMAN GOSCHKE, OF ENON VALLEY, PENNSYLVANIA.

VEHICLE-SPRING.

1,083,737.  Specification of Letters Patent.  Patented Jan. 6, 1914.

Application filed August 20, 1913. Serial No. 785,646.

*To all whom it may concern:*

Be it known that I, CHARLES H. GOSCHKE, a citizen of the United States of America, residing at Enon Valley, in the county of Lawrence and State of Pennsylvania, have invented certain new and useful Improvements in Vehicle-Springs, of which the following is a specification, reference being had therein to the accompanying drawing.

This invention relates to vehicle springs particularly adapted for use in connection with motor vehicles and has for its object to provide a spring of such class, in a manner as hereinafter set forth, for taking up the shock when the vehicle is traveling over an uneven surface or meets with an obstruction.

A further object of the invention is to provide a vehicle spring, in a manner as hereinafter set forth, particularly designed to eliminate the use of pneumatic tires on motor vehicles.

Further objects of the invention are to provide a vehicle spring which is comparatively simple in its construction and arrangement, strong, durable, embodying all of the advantages of a pneumatic cushion, efficient in its use, readily set up and comparatively inexpensive to manufacture.

With the foregoing and other objects in view the invention consists of the novel construction, combination and arrangement of parts, as hereinafter more specifically described and illustrated in the accompanying drawing, wherein an embodiment of the invention is shown, but it is to be understood that changes, variations and modifications can be resorted to which come within the scope of the claims hereunto appended.

Figure 1:
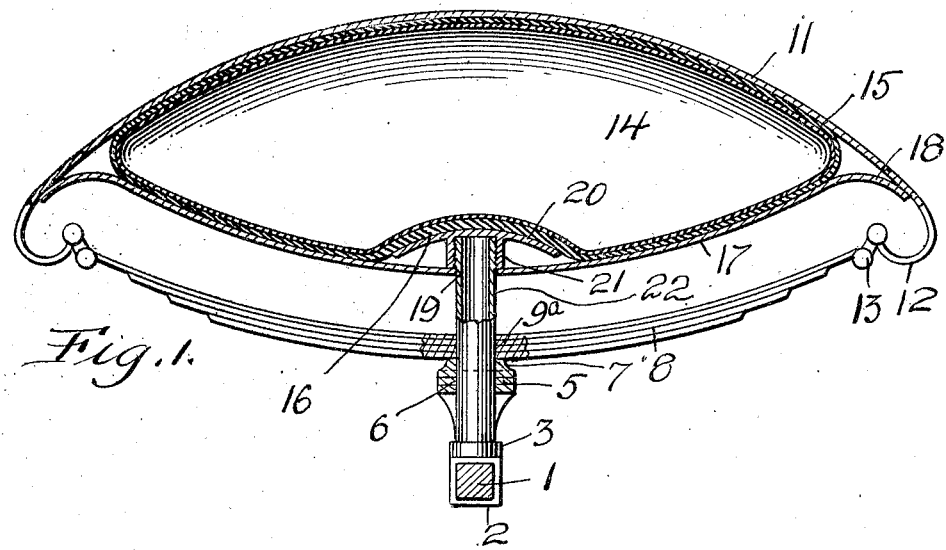
Figure 2:
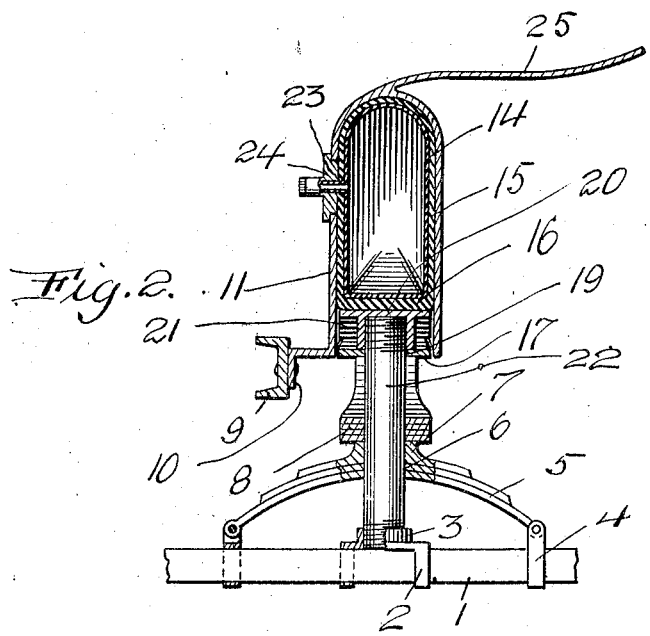

In the drawings, wherein like reference characters denote corresponding parts throughout the several views: Figure 1 is an elevation partly in longitudinal section of a vehicle spring in accordance with this invention, and Fig. 2 is a transverse sectional view thereof.

Referring to the drawings in detail 1 denotes an axle having secured thereto a bracket 2, provided with a vertically disposed interiorly threaded annular collar 3. Secured to the axle 1 and arranged at each side of the bracket 2 is a strap 4. Pivotally connected to the straps 4 are the ends of an arcuate laminated spring 5 formed with a centrally disposed opening 6. The upper leaf of the spring 5 has a vertically disposed boss 7. Mounted upon the boss 7 is a concave laminated spring 8 having a centrally disposed opening 9ª, which registers with the opening 6. The spring 8 is disposed at right angles to the spring 5 and is of greater length than the length of said spring 5. The spring 5 extends in the same direction as the axle 1 while the spring 8 is disposed longitudinally with respect to the vehicle body (not shown).

The reference character 9 denotes one of the side rails, or a brace of a motor vehicle body (not shown) and secured to said brace 9 is the angle-shaped end 10 of one side of a metallic casing 11, the latter being inverted U-shaped in cross section and open at its bottom. The casing 11 is spaced from the brace 9 and has each end provided with a curved extension 12, pivotally connected, as at 13 to one end of the spring 8. Arranged within the casing 11 is an inflatable member 14, inclosed by a flexible casing 15, the latter having the intermediate portion of its bottom of greater thickness than the remaining portion, as indicated at 16. The inflated member and its inclosing casing are supported by a concave spring 17, the latter being positioned above the spring 8 and having curved ends 18, bearing against the inner face of the top of the casing 11. The spring 17 is formed with a centrally disposed opening 19. Arranged over the spring 17, centrally thereof is a dome-shaped head 20, provided with an interiorly threaded depending collar 21, to which is secured the upper end of a plunger 22, the latter extending through the openings 19, 9 and 6, and having its lower end secured to the collar 3, whereby said plunger will be shifted during all movements of the axle 1.

The inflatable member 14 is provided with a filling tube 23, which extends through the flexible casing 15 and through a cap piece 24, carried by the metallic casing 11. The casing 11 has the top thereof integral with the fender or guard 25 of a vehicle.

The spring 5 is to be heavy enough so as to take up sudden shock from the axle 1 to the spring 8 and the vertical movement of the plunger 22 is had against the action of the inflated member 14, the latter and its casing 15 constituting a cushion for the movement of the plunger 22 thereby absorbing shock. The thickened portion of the bottom of the flexible casing 15 is provided to increase the life thereof, due to the action of the head 20.

The spring 8 is the main spring of the vehicle and is that which takes up the shock after the cushion has taken up enough to allow the axle to come up to the spring 8.

What I claim is:—

1. A vehicle spring comprising a pair of resilient elements, one supported by and disposed at right angles with respect to the other and the other supported by the vehicle axle, a casing pivotally connected to one of said resilient elements, a cushioning device arranged within said casing, and a headed plunger connected to the vehicle axle and extending through said resilient elements and engaging the bottom of said cushioning device.

2. A vehicle spring comprising a pair of resilient elements, one supported by and disposed at right angles with respect to the other and the other supported by the vehicle axle, a casing pivotally connected to one of said resilient elements, a cushioning device arranged within said casing, a headed plunger connected to the vehicle axle and extending through said resilient elements and engaging the bottom of said cushioning device, and a spring constituting the bottom of said casing and engaging the bottom of said cushioning device.

3. A vehicle spring comprising a pair of resilient elements, one supported by the other and one secured to the axle of a vehicle, a stationary casing, a compressible cushioning element arranged therein, and a plunger fixed to the axle, extending through said resilient elements and having a head bearing against the bottom of said cushioning element.

4. A vehicle spring comprising a pair of resilient elements, one supported by the other and one secured to the axle of a vehicle, a stationary casing, a compressible cushioning element arranged therein, a plunger fixed to the axle, extending through said resilient elements and having a head bearing against the bottom of said cushioning element, and a spring member constituting the bottom of said casing and bearing against said cushioning element.

5. A vehicle spring comprising a pair of resilient elements, one supported by the other and one secured to the axle of a vehicle, a stationary casing, a compressible cushioning element arranged therein, a plunger fixed to the axle, extending through said resilient elements and having a head bearing against the bottom of said cushioning element, and means for pivotally connecting the ends of one of said resilient elements to said casing.

6. A vehicle spring comprising an arcuate resilient element pivotally connected to the axle of a vehicle, a concave resilient element mounted upon the arcuate element and extending in an opposite direction with respect thereto, a stationary casing, means for pivotally connecting said concave element to said casing, a compressible cushioning element arranged within said casing, and a plunger fixed to the vehicle axle, extending through said resilient element and provided with a head bearing against said cushioning element.

7. A vehicle spring comprising an arcuate resilient element pivotally connected to the axle of a vehicle, a concave resilient element mounted upon the arcuate element and extending in an opposite direction with respect thereto, a stationary casing, means for pivotally connecting said concave element to said casing, a compressible cushioning element arranged within said casing, a plunger fixed to the vehicle axle, extending through said resilient element and provided with a head bearing against said cushioning element, and a spring member constituting the bottom of said casing and bearing against said cushioning element.

In testimony whereof I affix my signature in the presence of two witnesses.

CHARLES HERMAN GOSCHKE.

Witnesses:
    J. E. MARSHALL,
    G. M. COBLENTZ.